United States Patent
Schlemmer (10) Patent No.: US 10,512,918 B2
(45) Date of Patent: Dec. 24, 2019

(54) PROCEDURE, FILTER MODULE, AIR CLEANING DEVICE COMPOSED OF SUCH FILTER MODULES FOR THE HIGHLY EFFICIENT CLEANING OF AIR CONTAINING SMALL CONTAMINATING PARTICLES

(71) Applicant: Laszlo Schlemmer, Budapest (HU)

(72) Inventor: Laszlo Schlemmer, Budapest (HU)

(*) Notice: Subject to any disclaimer, the term of this patent is extended or adjusted under 35 U.S.C. 154(b) by 190 days.

(21) Appl. No.: 15/529,997

(22) PCT Filed: Nov. 20, 2015

(86) PCT No.: PCT/HU2015/000073
§ 371 (c)(1),
(2) Date: May 26, 2017

(87) PCT Pub. No.: WO2016/083854
PCT Pub. Date: Jun. 2, 2016

(65) Prior Publication Data
US 2017/0326557 A1    Nov. 16, 2017

(30) Foreign Application Priority Data

Nov. 26, 2014  (HU) ..................... 1400556

(51) Int. Cl.
*B01D 53/02*     (2006.01)
*B03C 3/02*      (2006.01)
(Continued)

(52) U.S. Cl.
CPC ............. *B03C 3/025* (2013.01); *B03C 3/08* (2013.01); *B03C 3/47* (2013.01); *B03C 2201/14* (2013.01); *B03C 2201/24* (2013.01)

(58) Field of Classification Search
CPC . B03C 2201/14; B03C 2201/24; B03C 3/025; B03C 3/08; B03C 3/47
See application file for complete search history.

(56) References Cited

U.S. PATENT DOCUMENTS

4,257,258 A * 3/1981 Bovenlander ........ G01N 1/2252
                                                              73/23.31
4,342,571 A * 8/1982 Hayashi ................... B03C 3/08
                                                                 96/76
(Continued)

*Primary Examiner* — Christopher P Jones
(74) *Attorney, Agent, or Firm* — Sarika Singh; McNeely, Hare & War LLP (57) ABSTRACT

The subject of the invention is a procedure, a filter module, and an air cleaning device composed of such filter modules for the highly efficient cleaning of air containing small contaminating particles. In the course of the procedure, the principle of adhesion and repelling effect is exploited to capture the contaminating particles in the device composed of an appropriate number of filter modules (1). The air to be cleaned is moved like a quasi-electrodynamic linear engine in the device, so that the mass and/or size of the coagulated particles is increased by the powers of two as necessary while passing through two sequential filter modules (1), up to $2^{20}$ value. This way, the flow velocity of the fine grains with increased mass is decreasing gradually and they are separated or fall out from the flow space, meaning that particles with a starting size below 1 micrometre, in the nano-range, which are the most harmful to the human body, may also be captured. The essential part of the invention is the filter module (1) that is fitted with electrodes (7), composed of a collector (5) and a separator (6) located at a given distance, which are connected to a positive or negative high voltage (8, 9) and are surrounded by a cover consisting of a base plate, connected to zero potential (10), side plates, and a cover plate. Two electrodes (7) form an electrode pair, and two electrode pairs form a filter module (1), where the electrode pairs are placed so that there is one electrode (7) of the opposite potential installed between two electrodes (7) of the same potential. The solution according to the invention may be used in versatile ways, especially on the field of civil environmental protection, as stand-alone, pre-, or post-filter, such as for cleaning the air and exhaust gas in the (Continued)

chimney of industrial plants, for cleaning polluted urban air, for cleaning, de-germination, and filtering pollen from the air of closed premises, and for military purposes on the field of NBC safety as a pre-filter.

11 Claims, 7 Drawing Sheets

(51) Int. Cl.
*B03C 3/08* (2006.01)
*B03C 3/47* (2006.01)

(56) References Cited

U.S. PATENT DOCUMENTS

| | | | |
|---|---|---|---|
| 2004/0123739 A1* | 7/2004 | Jan | B03C 3/08 96/18 |
| 2005/0051420 A1* | 3/2005 | Botvinnik | B03C 3/08 204/164 |
| 2010/0051709 A1* | 3/2010 | Krichtafovitch | B03C 3/08 236/36 |
| 2010/0251889 A1* | 10/2010 | Haruna | B03C 3/08 95/79 |
| 2015/0174587 A1* | 6/2015 | Wei | B03C 3/12 422/186.04 |
| 2016/0096183 A1* | 4/2016 | Guerry | B03C 3/41 95/78 |
| 2017/0209871 A1* | 7/2017 | Luo | B03C 3/41 |

\* cited by examiner

PROCEDURE, FILTER MODULE, AIR CLEANING DEVICE COMPOSED OF SUCH FILTER MODULES FOR THE HIGHLY EFFICIENT CLEANING OF AIR CONTAINING SMALL CONTAMINATING PARTICLES

CROSS-REFERENCE TO RELATED APPLICATIONS

This application is a National Phase Application under 35 USC 371 of PCT/HU2014/000073, filed Nov. 20, 2015 (published as WO 2016/083854) and claiming priority to Hungarian patent application No. P1400556, filed on Nov. 26, 2014. The disclosure of the prior applications are considered part of and is incorporated by reference in their entirety in the disclosure of this application.

The subject of the invention is a procedure, a filter module, and an air cleaning device composed of such filter modules for the highly efficient cleaning of air containing small contaminating particles.

The solution according to the invention may be applied advantageously for capturing nanometre sized particles that are smaller than one micrometre (e.g. chemical molecules, aerosols, heavy metals, metal steams, radiating elements, bacteria, spores) and, consequently, for preventing the direct poisoning of the human body. It is also suitable for separating molecule sized solid, chemical, and biological contaminating particles, thereby providing clean air.

The technical characteristics of the procedure and the device according to the invention also make it possible to connect it to already existing central air supply and air conditioning systems because it does not form any obstacle in the airway and it even helps the air moving without changing the technical characteristics of the already existing and operating systems.

It is known that, as a result of civilization and development, modern techniques and technologies improve the quality of life of the members of society on all fields of life (nutrition, medical care, healthcare, culture, working conditions, reduced power use etc.).

However, development also has some adverse effects, one significant adverse effect being increased air pollution. It damages the quality of life significantly and it causes illnesses and other damages to health. These include primarily respiratory damages (asthma, allergy, pollen intolerance, bronchial tube enlargement etc.) that require treatment through medications or even surgery in serious cases. Such treatments also have adverse effects that are harmful to the human body.

The increased air pollution, that used to be the consequence of natural disasters only (volcano eruptions, floating dust, gases) is now caused by civilization and development to a significant extent.

Air quality is also influenced significantly by the increased vehicle traffic, the damaging materials that are produced by industrial facilities, cleaner and metal steams, micro-dust, diesel-dust etc. Furthermore, the dust, dust mites, cigarette smoke, oil steams, and fungi spores coming from moulds in modern apartments also have a significant effect. The bacteria and bacterium cultures settling down and living in modern air conditioning and air supply systems result in the biological contamination of the air and may cause the already well-known legionella disease.

The known air cleaning devices representing the state of the art are complex subunits: filter for coarse particles, HEPA filter, active coal, germicide lamp, ionizator. These devices attempt to produce clean air by installing such items in sequence. Air is moved by a ventilator. Due to the gradual filling-up, these systems require more and more energy and the filter cartridge also needs to be replaced frequently. However, they are unable to capture contaminants that are smaller than one micrometre and fall into the nanometre size range (chemical molecules, heavy metals, metal steams, radiating elements, bacteria, spores), while such contaminants are not cleared from the respiratory system either and make their way to the bronchial tubes of the lung and then enter the blood flow, thereby poisoning the human body directly.

Such nanometre sized particles, aerosols, and biological contaminants can be measured with special or indirect methods only.

As for documents on the field of industrial property rights, the state of the art is represented, for example, by patent description No. US 2004089156 describing a dynamic electrostatic aerosol separator device that can be used to separate and remove particles floating in the air. One of the shortfall of this known solution is that it can remove only aerosols from the air, but it is not able to capture solid particles, chemical materials, or biological contaminants; it also includes a ventilator that produces noise during its operation.

The device and procedure for the electrostatic treatment of aerosols described in document No. U.S. Pat. No. 6,805,732 also represents the state of the art. This known solution is fit for removing chemical materials only, and, for all practical purposes, it includes a filter cartridge that needs to be replaced, when full, because the air cannot pass through it. Another shortfall of this invention is that its power consumption is significant, and it also includes a ventilator the use of which makes the operation of the device noisy, as mentioned above.

The invention aims to eliminate the shortfalls of the known solutions and to implement a procedure, a filter module, and an air cleaning device composed of such filter modules that can be used for a variety of purposes to capture contaminating particles that are smaller than one micrometre and fall within the nanometre size range and to separate molecule sized solid, chemical, and biological contaminants, with a modular structure, silent operation, highly efficient cleaning, low power consumption, economic operation, cheap and simple maintenance, and the possibility of being installed in already existing systems.

The solution according to the invention is based on the recognition that even particles that are smaller than 1 micrometre and even microorganisms can be separated and captured and the purpose of the invention, i.e. air cleaning with high efficiency, may be achieved by setting up electrodes connected to positive or negative high voltage and consisting of two parts, a collector and a separator located in a given distance from the collector, so that they are surrounded by a cover connected to zero potential and consisting of a base plate, side plates, and a cover plate, and by creating electrode pairs from two opposite electrodes connected to positive or negative high voltage and zero potential, and by creating a filter module of two electrode pairs, where the electrode pairs are placed so that an electrode of the opposite potential is installed between two electrodes of the same potential, and by creating a device, consisting of the necessary number of filter modules connected in serial and/or parallel positions, that both cleans the air and also moves the air to be cleaned as a quasi-electrodynamic linear engine, so that the mass and/or size of the coagulated particles is increased as necessary by the powers of 2 up to maximum $2^{20}$ in the course of passing through two connected filter modules.

The subject of the invention is a procedure, a filter module, and an air cleaning device composed of such filter modules for the highly efficient cleaning of air containing small contaminating particles.

The most general implementation form of the procedure according to the invention is described in claim 1. The variations of the procedure are described in claims 2 to 5.

The most general implementation form of the filter module according to the invention is described in claim 6. An example may be implemented according to claim 7.

The most general implementation form of the air cleaning device consisting of the filter modules according to the invention and used to implement the procedure according to the invention is described in claim 8. The various implementation forms are described in claims 9 to 15.

The solution according to the invention is presented in more detail on the basis of the following drawings.

For the purpose of this invention, mirror installation means that the filter module 1 is mounted on the opposite side (backside) of the base plate 2, rotated by 180 degrees, and is fitted with a cover turning part 19.

Figure 1:
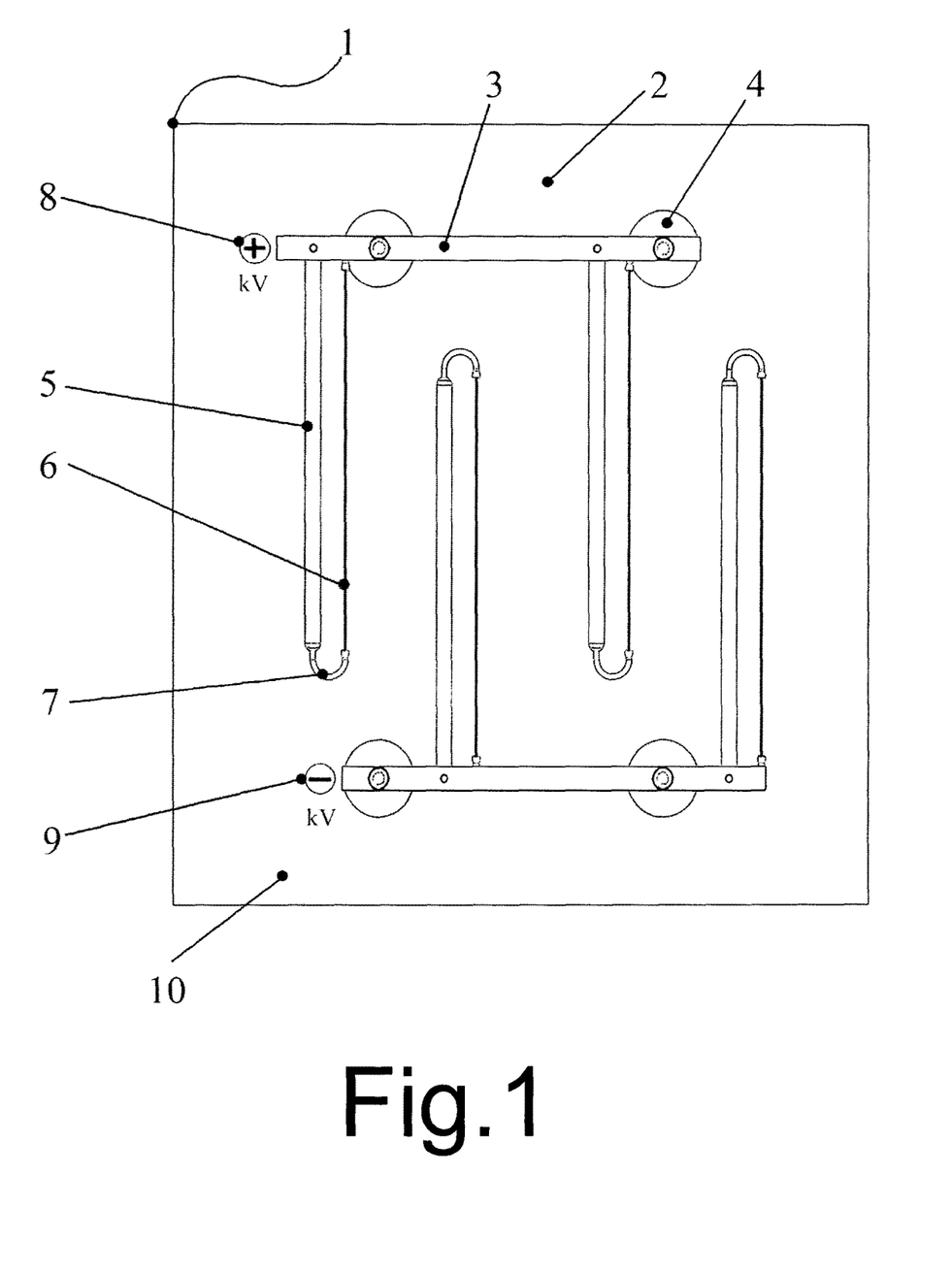
FIG. 1 shows the front view of an advantageous implementation of the filter module according to the invention.

FIG. 1 shows the front view of an advantageous implementation for of the filter module 1 according to the invention. The filter module 1 is mounted onto the base plate 2, which is connected to zero potential 10, just like the side plates and the cover plate that are not show on the drawing. The drawing also shows the two electrode rails 3 with four insulation blocks 4 and connected to the positive high voltage 8 or the negative high voltage 9. Positive high voltage 8 and negative high voltage 9 is produced by the power supply unit 17 shown on FIG. 3. The four electrodes 7, each consisting of a collector 5 and a separator 6, are connected to the two electrode rails 3. The two opposing electrodes 7, connected to the positive high voltage 8 and negative high voltage 9 respectively, as well as to the zero potential 10, for an electrode pair, and two electrode pairs form the filter module 1, in which the electrode pairs are installed so that one electrode 7 of the opposite potential is installed between two electrodes 7 of the same potential, as shown on the drawing clearly.

Figure 2:
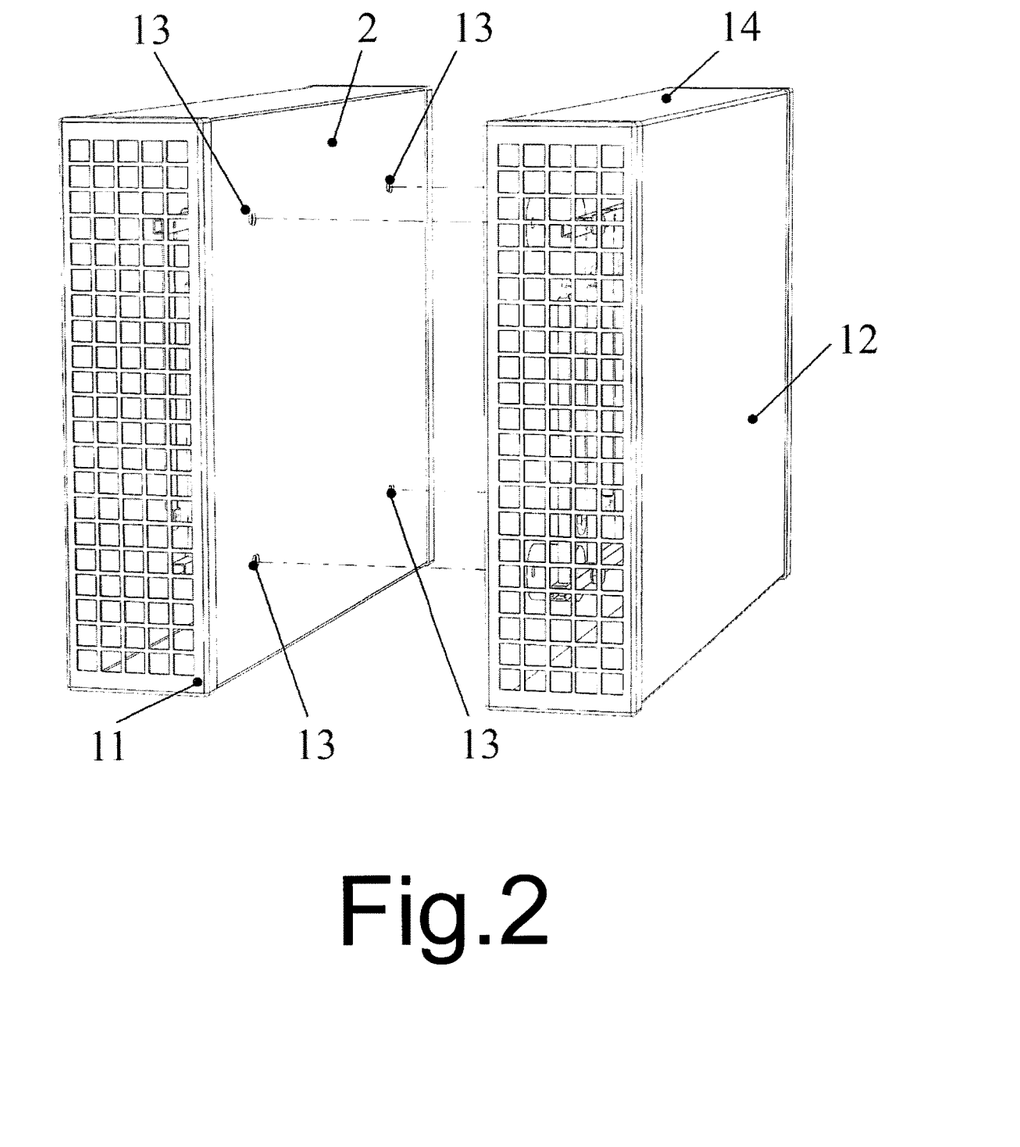
FIG. 2 shows the axonometric drawing of two filter modules before they are connected in a parallel position.

FIG. 2 shows the axonometric drawing of two (n=2) filter modules 1 before they are connected in a parallel position. The drawing indicates the base plate 2, the vertical cover plate 11 (front plate), one side plate 12, and four connecting bores 13 on the base plate 2. The base plate 2, the cover plate 11, and the two side plates 12 form the cover 14 of the filter module 1.

Figure 3:
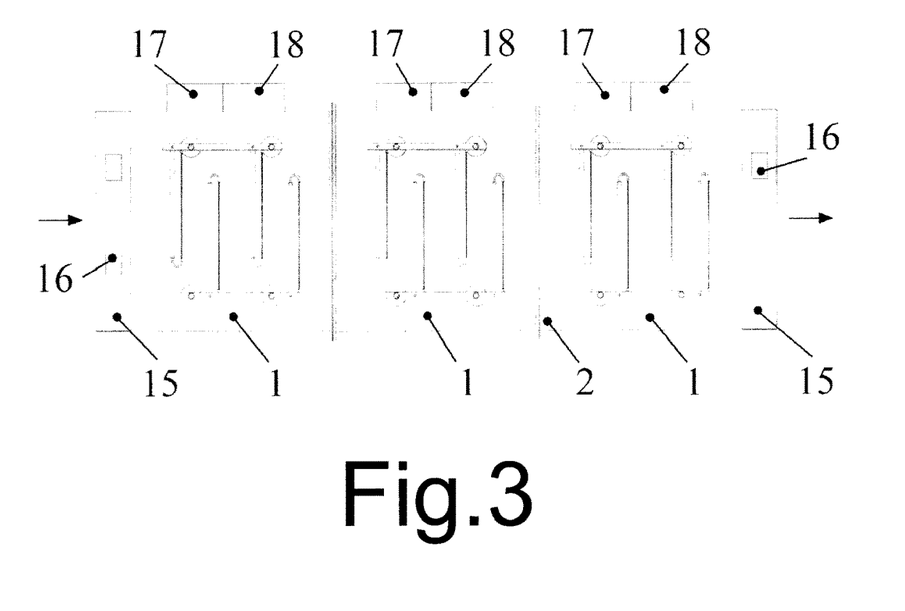
FIG. 3 shows the front view of three filter modules connected in serial position, with a sensor module on both ends.

FIG. 3 shows the front view of three (n=3) filter modules when connected in a serial position, with one sensor module 15 at each end of the structure, which can be connected to large industrial devices, for example, they can be built into existing air supply systems. One, advantageously more sensors 16 are mounted onto the 2 inlet and outlet openings of the filter modules 1 on the ends of the structure. Each filter module 1 is fitted with a power supply unit 17 that powers the control unit 18 and the sensor module 15 housing the sensors 16. The sensor modules 15 and the sensors 16 are designed to be able to measure and display the contamination level and characteristics of the inbound and outbound air, as well as to ensure compliance with the required level of air cleanness, and to regulate the positive or negative high voltage 8, 9 as required. The control unit 18 is designed to be able to receive and transmit the signals concerning the values measured by the sensors 16, and to regulate the level of the positive or negative high voltage 8, 9 that ensure the operation. The power supply unit 17 powering the individual units and the sensors 16 is designed to be able to run on 230 V network supply, battery, or solar panel.

The arrows on the drawing indicate the direction of the airflow. The arrow on the left side indicates the flow of inbound and contaminated air, while the arrow on the right side indicates the departure of the leaned air.

Figure 4:
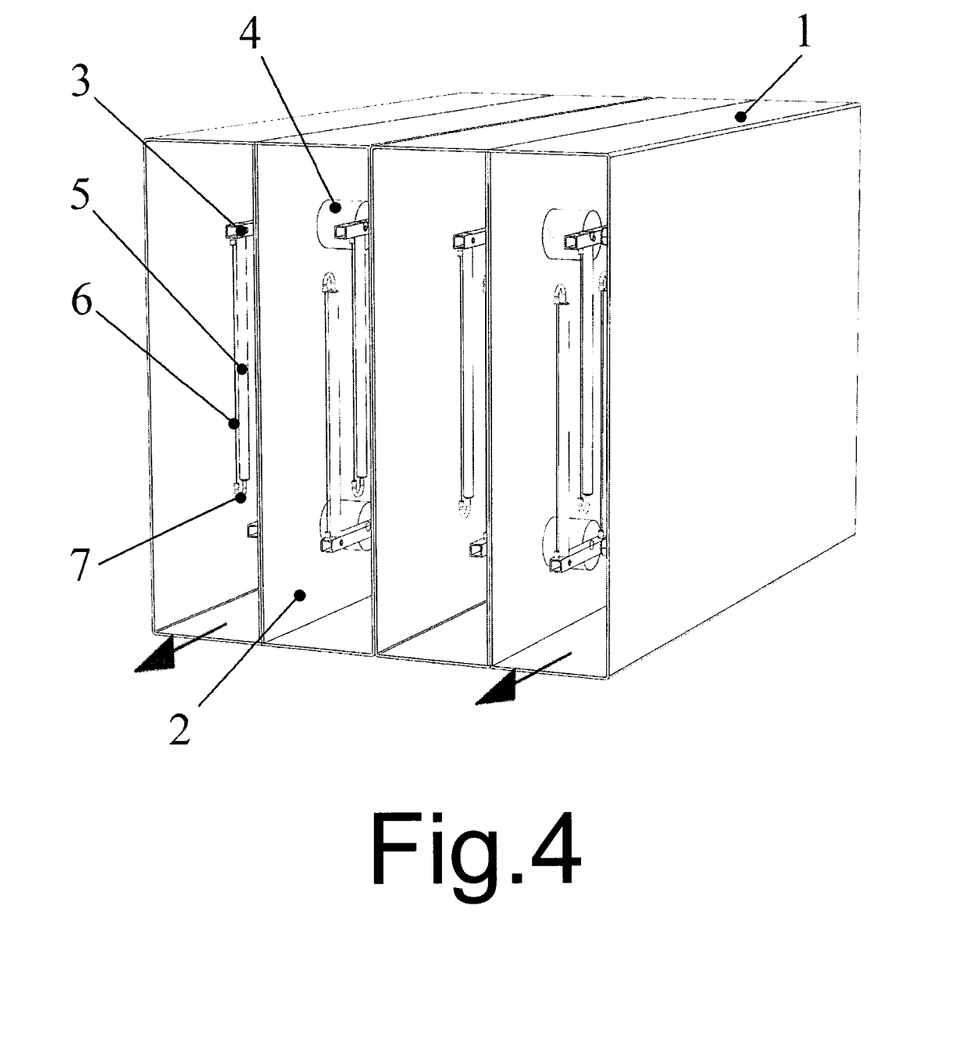
FIG. 4 shows the axonometric drawing of four filter modules when connected in a parallel position.

FIG. 4 shows the axonometric drawing of four filter modules connected in a parallel position, meaning that the number n of the filter modules 1 is equal to four.

In such a situation, the four filter modules 1 are mounted onto each other in a releasable manner in a parallel position and along the axis that is perpendicular to the position shown on FIG. 2. The figure shows the filter module 1, the base plate 2, the electrode rail 3, the insulation block 4, and the collector 5 and separator 6 parts of the electrode 7. The arrows shown on the drawing and pointing toward the same direction indicate the direction of the inbound contaminated air to be cleaned.

Figure 5:
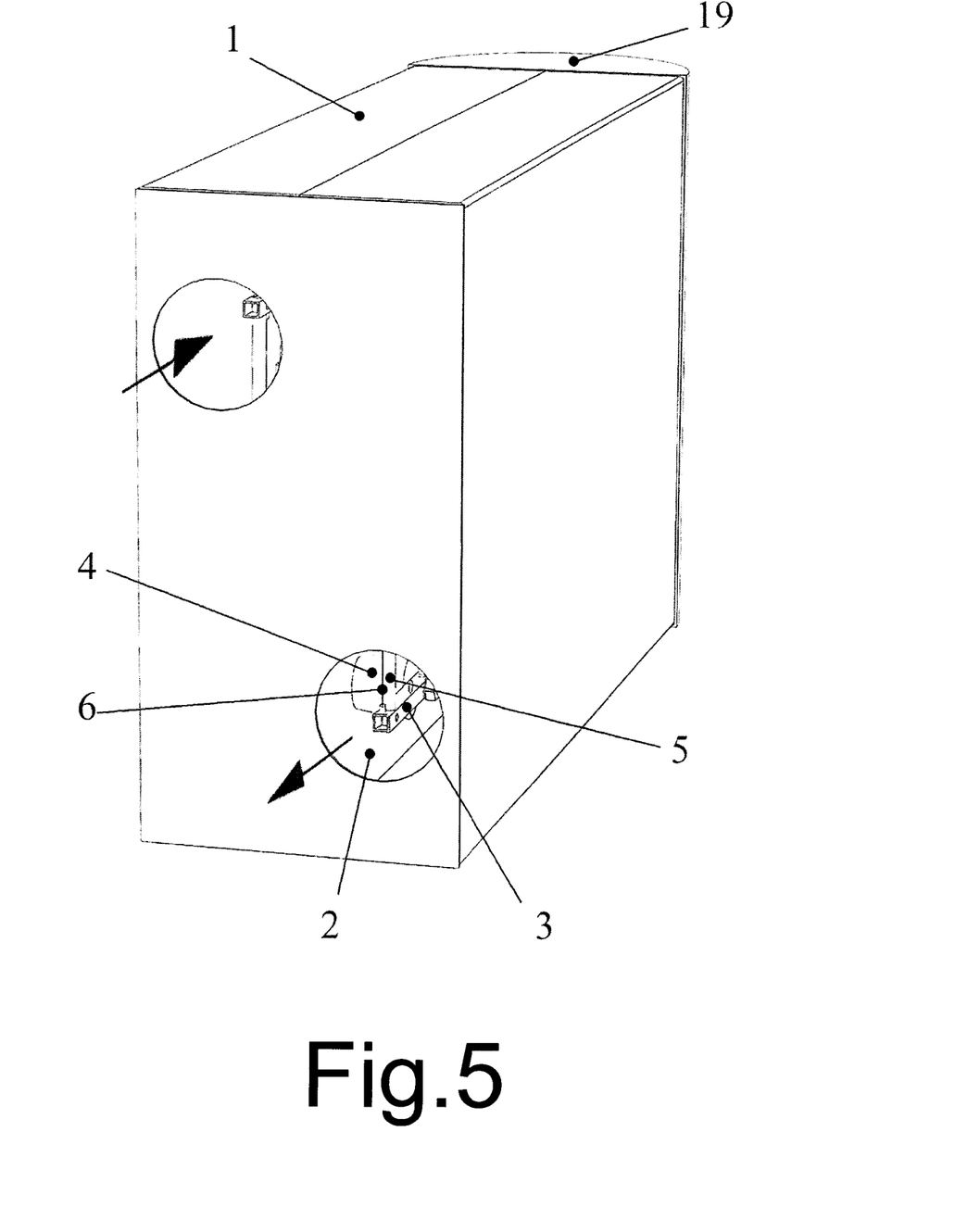
FIG. 5 shows the axonometric drawing of two filter modules when installed in mirror position.

FIG. 5 shows the axonometric drawing of two (n=2) filter modules when installed in a mirror position. In such a situation, the two filter modules 1 are connected to each other in a releasable manner in a parallel position along their vertical axis. The drawing shows the filter module 1, the base plate 2, the electrode rail 3, the insulation block 4, the collector 5, the separator 6, and the cover turning part 19 used to reverse the flow direction of the air the be cleaned. In such a situation, the electrode pairs of the filter module 1 are installed in the individual filter modules 1 so that they mirror each other, and they are closed by the above-mentioned cover turning part 19 at the ends that are opposite to the original flow direction. The cover turning part 19 has a half-pipe or reversed U shape advantageously. The contaminated air to be cleaned is flowing in the upper left part of one filter module 1 toward the separator 6, while the cleaned air is leaving in the lower right part of the other filter module 1, as also indicated by the arrows on the drawing.

Figure 6:
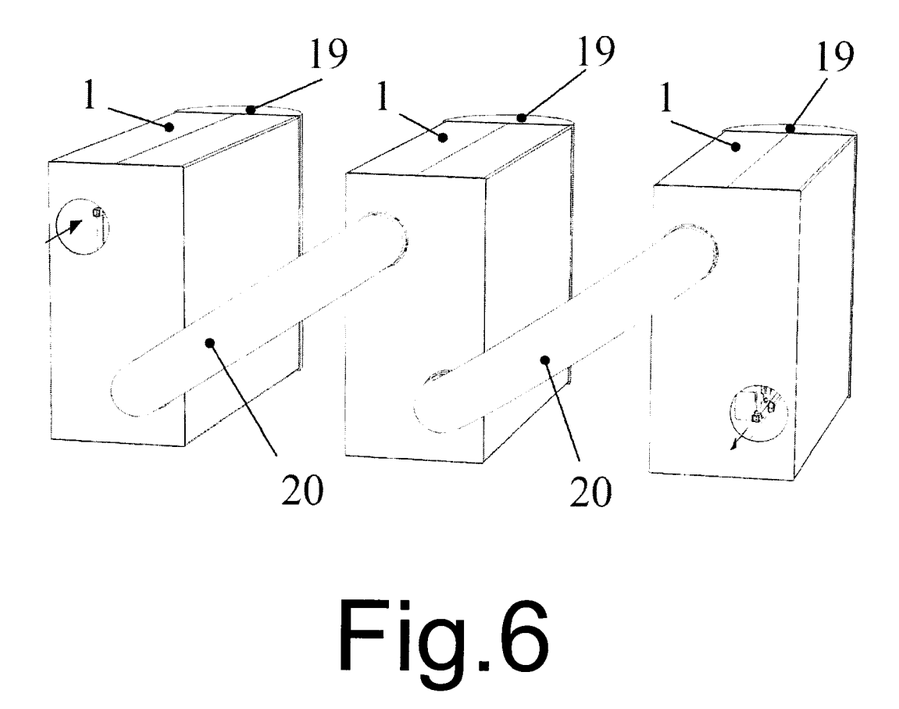
FIG. 6 shows the axonometric drawing of three filter module pairs connected and installed in a parallel mirror position.

FIG. 6 shows the axonometric drawing of three filter module 1 pairs (n=6) connected in serial mirror position. The filter module pairs installed in mirror position are connected to each other serially in a releasable manner, so that the filter modules 1 of the pair in the middle are connected to the neighbouring filter modules 1 with a flexible pipe 20.

In addition to the filter modules 1 and the flexible pipes 20, the drawing also shows the cover turning parts 19 and the direction of the airflow.

Figure 7:
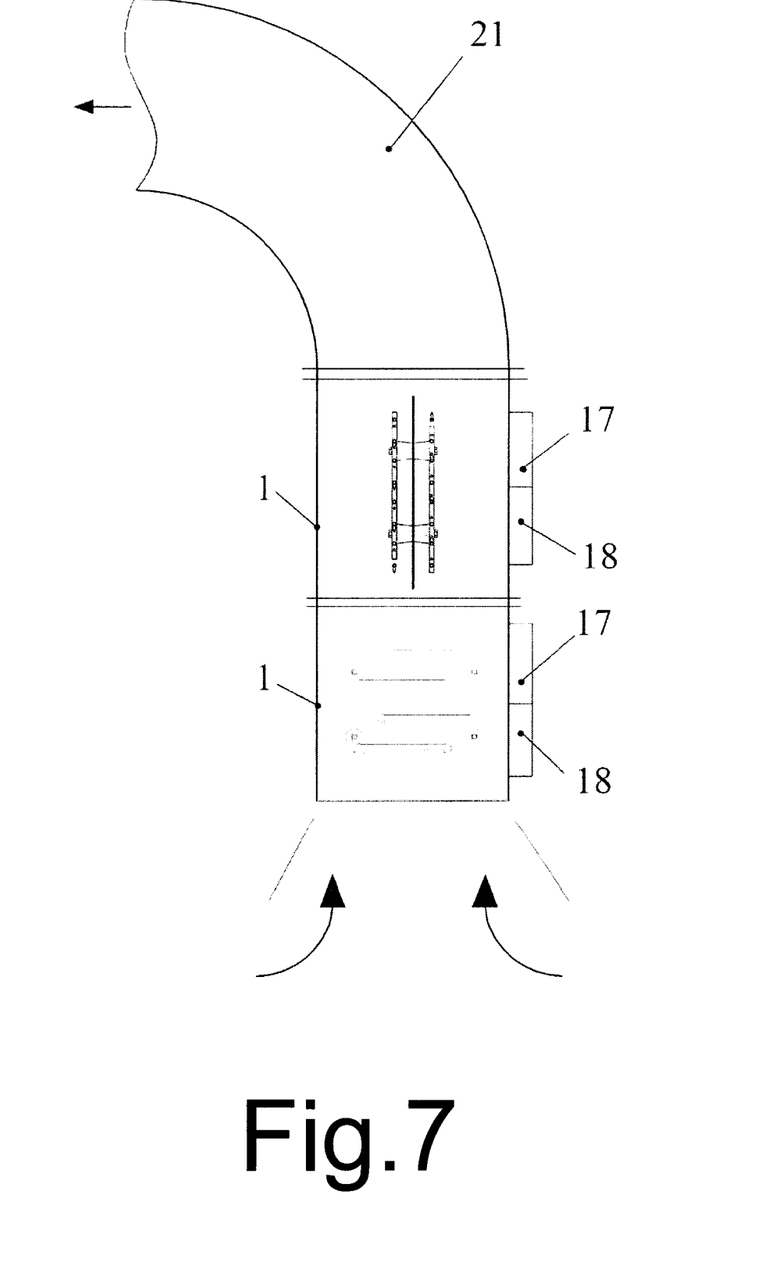
FIG. 7 shows the theoretical drawing of two serially connected filter modules when installed in an existing pipe.

FIG. 7 shows the theoretical drawing of two serially connected filter modules 1 built into an existing pipe 21. The two filter modules 1, fitted with a power supply unit 17 and a control unit 18, are built into a shape having a circular cross-section, such as an air exhauster. Relative to the lower filter module 1, the other filter module 1 on top is rotated in a 90 degree angle because doing so improves the air cleaning efficiency. The two arrows in the bottom of the drawing indicate the flowing direction of the air to be cleaned, while the upper arrow indicates the flow direction of the cleaned air.

With regard to the above considerations, the air cleaning device implemented with the procedure and filter modules 1 according to the invention operates as follows. The air to be cleaned is channeled to the device composed of the appropriate n number of filter modules 1 according to the invention, each consisting of two electrode pairs, and the device sucks in and moves the air. The principle of adhesion and repelling effect is exploited to capture the contaminating particles. During the operation, the electrodes 7, each consisting of a collector 5 and a separator 6, of the electrode pair is connected to the positive or negative high voltage 8, 9 generated by the power supply unit 17 and their cover 14 is connected to the zero potential 10.

This way, one electrode 7 of the electrode pair has a positive charge, the other electrode 7 has a negative charge. The contaminating particle molecule that gets stuck to the positively charged separator 6 is pushed away by the repelling effect of the identical charges, so that the molecule moves to the collector 5 of the neighbouring negatively charged electrode 7, and it joins and coagulates the other molecules that are already stuck there and have an opposite charge, and the pair continues the process and keeps moving through the electrodes 7. Then, the coagulated pairs move through the filter module 1 and their mass is increased by the powers of two until they reach a size needed for them to fall out of the airflow, and they get stuck either to one of the electrodes 7 fitted with a collector 5, or to the cover 14 that has a zero potential 10. All in all, the flow of air is facilitated by two effects, i.e. the pulling effect of the airflow and the repelling effect of particles having the same charge, until the adhesive power of the particles, having a continuously increasing mass, becomes stronger than the repelling effect of identical charges and until the contaminant falls out of the airflow due to its increased mass, so that the contaminating particles could be removed from the airflow, thereby allowing for the cleaning of the air with high efficiency.

In the course of the procedure, the separation of the contaminating particles is carried out with regard to the operating parameters, such as the initial size, the speed of flow, and the n number of the filter modules 1.

In the course of the procedure, high flow speed and the separation of contaminating particles with an initial size in the nano-range is achieved by using more filter modules 1 than in the case of lower flow speed or when the size of the contaminating particles to be removed is in the micro-range.

According to the task, it might be necessary to reverse the direction of the airflow to be cleaned. In such a situation, the electrode pairs of the filter modules 1 are fitted into the individual filter modules 1 in mirror position, and they are also closed by a cover turning part 19 at the end that is opposite to the original flow direction, as shown on FIGS. 5 and 6.

In the course of implementing the procedure according to the invention, the air to be cleaned, in addition to being cleaned, is moved like a quasi-electrodynamic linear engine, so that the mass and/or size of the coagulated particles is increased by the powers of two as necessary while passing through two sequential filter modules 1, up to $2^{20}$ value, which is over one million times of the original size.

The most important unit of the air cleaning device according to the invention is the filter modules designed according to this invention.

The filter module 1 has electrodes 7, which are composed of a collector 5 and a separator 6 located at a given distance from the collector 5, are connected to a positive high voltage 8 or negative high voltage 9, and are surrounded by a cover 14 consisting of a base plate 2, connected to zero potential 10, side plates 12, and a cover plate 11. Two electrodes 7 connected to the opposing positive or negative high voltage 8, 9 and to the zero potential 10 form an electrode pair, and two electrode pairs form a filter module 1. The electrode pairs are placed in the filter module 1 so that there is one electrode 7 of the opposite potential installed between two electrodes 7 of the same potential.

Two filter modules 1 may be used to implement a twin module that may be also used advantageously. As noted above, certain tasks may require the flow direction of the air to be cleaned to be reversed. In such a scenario, the electrode pairs of the filter module 1 are installed in the individual filter modules 1 in mirror position, and they are closed with a cover turning part 19 at the end opposite to the original direction flow.

Using the filter modules 1 described above, an air cleaning device according to the invention may be implemented that is fitted with n number of filter modules 1, connected to each other in serial and/or parallel positions depending on the task, in order to achieve the desired increase in size and mass of the contaminating particles. The cleaning efficiency may be increased as necessary by using mixed connection.

The number n of the filter modules 1 is determined by taking into account that the mass and/or size of the coagulated particles increases while passing through two subsequent filter modules 1 by the powers of two, up to the value of $2^{20}$, when the original size reaches the threshold that allows the contaminating particles to be filtered or separated with certainty.

In order to capture particles the size of which is 0.1 micrometre or larger, the filter modules 1 are connected in a parallel position along their vertical axis in a releasable manner.

In order to capture nanometre or molecule sized particles, the filter modules 1 are connected to each other serially and in a releasable manner through their side plates 12 along their longitudinal axis that is perpendicular to the vertical axis.

In both cases, the releasable joining works without damaging; it may be, for example, a screw connection for parallel connection, or, for example, a screw connection or cam-type closure for serial connection.

When connected to large industrial devices, the filter modules 1 are fitted with a sensor module 15 containing sensors 16 placed at the input and output openings, with a control unit 18, and with a power supply unit 17 enabling the operation of the above, as shown on FIG. 3.

The sensor modules 15 and the sensors 16 are designed to be able to measure and display the contamination level and characteristics of the inbound and outbound air (e.g. flow velocity, humidity, temperature), as well as to ensure compliance with the required level of air cleanness, and to regulate the operating positive or negative high voltage 8, 9 as required.

The control unit 18 is designed to be able to receive and transmit the signals concerning the values measured by the sensors 16, and to regulate the level of the positive or negative high voltage 8, 9 that ensure the operation.

In an advantageous implementation example, the control unit 18 may also be implemented within the power supply unit 17 as a subunit thereof.

The power supply unit 17 is designed to run on 230 V network power, a battery, or a solar panel, because only a small electric performance is required, which is $10^3$/h, approximately 1 W to move and clean the air.

When implementing the air cleaning device according to the invention, the insulation block 4 is made of ceramics, glass, or plastic, the base plate 2 is a metal sheet, the cover 14 is made of metal or plastic, the cross-section of the collector 5 of the electrode 7 is significantly larger than the cross-section of the separator 6, the relationship between the two cross-sections being at least four.

The operating positive or negative high voltage 8, 9 of the electrodes is a few kV, at least 4 kV.

As needed, filter modules 1 with 20 m³/h, 150 m³/h, or 500 m³/h capacity may be produced, and they may also be connected to each other in serial and/or parallel position according to the required level of efficiency.

For industrial application, filter units with, for example, 20,000 m³/h capacity may also be constructed by combining filter modules 1 of 500 m³/h capacity.

The solution according to the invention may be used in versatile ways, especially on the following fields:
on the field of civil environmental protection, as stand-alone, pre-, or post-filter, such as:
cleaning the air and exhaust gas in the chimney of industrial plants (foundry shops, paint shops, plants causing chemical pollution);
cleaning polluted urban air (traffic junctures, tunnels, hazardous smog locations etc.);
cleaning, de-germination, and filtering pollen from the air closed premises (hospitals, laboratories, restaurants, residential rooms etc.);
military application on the field of NBC safety as a pre-filter.

The solution according to the invention achieved its purposes and has the following advantages:
it may be used to capture contaminating particles that are smaller than one micrometre and are in the nanometre range, and to separate molecule-sized solid, chemical, and biological contaminants;
it has a modular structure;
the air may be moved without a ventilator and running in a silent mode;
no filter cartridge is needed;
the direction of the flow may be reversed easily;
cleaning is highly efficient, approximately 95%;
energy efficiency;
economic operation;
simple and cheap maintenance;
easy to install in existing systems.

The invention claimed is:

1. A filter module for the cleaning of air containing small contaminating particles with high efficiency, characterized in that it is fitted with identically constructed electrodes (7), composed of a collector (5) and a separator (6) located at a given distance, which are connected to a positive high voltage (8) or a negative high voltage (9), and are surrounded by a cover (14) consisting of a base plate (2), connected to zero potential (10), side plates (12), and a cover plate (11), and that two identically constructed electrodes (7) form an electrode pair, while two electrode pairs form a filter module (1), in which the electrode pairs are positioned so that between two electrodes of identical potential (7) is an electrode of the opposite potential (7), such that the air to be cleaned is moved like a quasi-electrodynamic linear engine.

2. The filter module according to claim 1, characterized in that, in order to reverse the direction of the airflow to be cleaned, the electrode pairs of the filter module (1) are installed in the individual filter modules (1) in mirror position, and are closed at the ends of the filter module (1) by flow-reversing module elements that reverse the original direction of the air-flow.

3. An air cleaning device composed of filter modules (1) according to claim 1, characterized in that it consists of a number (n) of filter modules (1) that are connected to each other in a serial and/or parallel position.

4. The device according to claim 3, characterized in that, in order to capture particles the size of which is 0.1 micrometre or larger, the filter modules (1) are connected in a parallel position in a releasable manner.

5. The device according to claim 4, characterized in that, in order to capture nanometre or molecule sized particles, the filter modules (1) are connected to each other through their side plates (12) serially and in a releasable manner.

6. The device according to claim 4, characterized in that, in order to increase the cleaning efficiency as desired, the filter modules (1) are connected in parallel and serial positions.

7. The device according to claim 3, characterized in that, in order to connect to large industrial devices, sensor modules (15), in which sensors have been placed in the filter modules (1), are fitted with a control unit (18) powered by an electric power unit (17).

8. The device according to claim 7, characterized in that the sensor modules (15) and the sensors (16) are designed to be able to measure and display the contamination level and characteristics of the inbound and outbound air, as well as to ensure compliance with the required level of air quality, and to regulate the operating positive or negative high voltage (8, 9) as required.

9. The device according to claim 8, characterized in that the control unit (18) is designed to be able to receive and transmit the signals concerning the values measured by the sensors (16), and to regulate the level of the positive or negative high voltage (8, 9) that ensure the operation of the device.

10. The filter module according to claim 1, characterized in that the cross-section of the collector 5 of the electrode 7 is significantly larger than the cross-section of the separator 6.

11. The filter module according to claim 10, characterized in that the cross-section of the collector 5 is at least four times larger than the cross-section of the separator 6.

* * * * *